SYSTEM FOR DETECTION OF DIGITAL DATA BY INTEGRATION

Filed Jan. 14, 1969 5 Sheets-Sheet 1

INVENTOR
JOHANNES C. VERMEULEN
BY Fraser and Bogucki
ATTORNEYS

SYSTEM FOR DETECTION OF DIGITAL DATA BY INTEGRATION

Filed Jan. 14, 1969 5 Sheets-Sheet 2

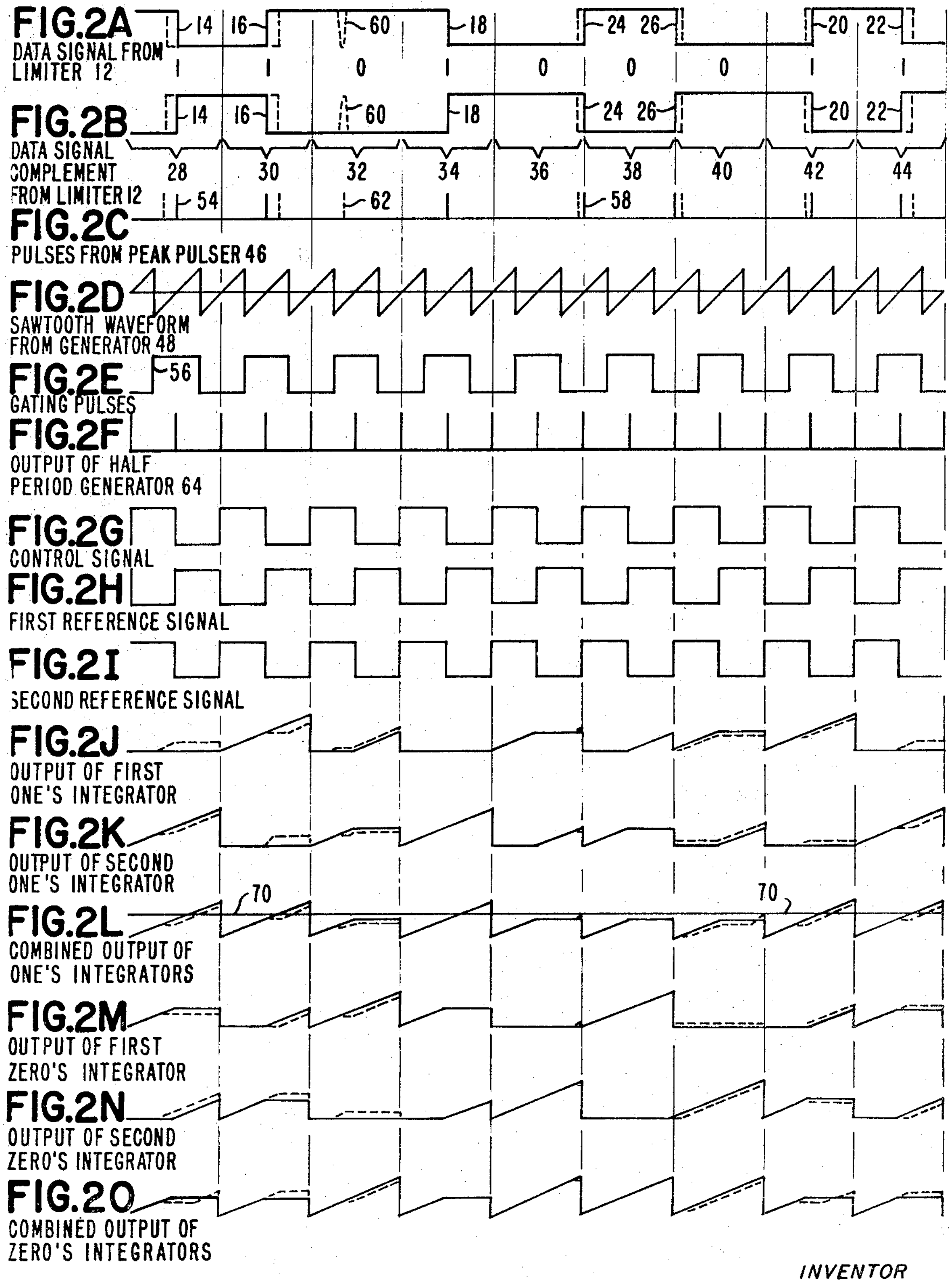

FIG.2A, FIG.2B, FIG.2C, FIG.2D, FIG.2E, FIG.2F, FIG.2G, FIG.2H, FIG.2I, FIG.2J, FIG.2K, FIG.2L, FIG.2M, FIG.2N, FIG.2O

FIG.2A DATA SIGNAL FROM LIMITER 12

FIG.2B DATA SIGNAL COMPLEMENT FROM LIMITER 12

FIG.2C PULSES FROM PEAK PULSER 46

FIG.2D SAWTOOTH WAVEFORM FROM GENERATOR 48

FIG.2E GATING PULSES

FIG.2F OUTPUT OF HALF PERIOD GENERATOR 64

FIG.2G CONTROL SIGNAL

FIG.2H FIRST REFERENCE SIGNAL

FIG.2I SECOND REFERENCE SIGNAL

FIG.2J OUTPUT OF FIRST ONE'S INTEGRATOR

FIG.2K OUTPUT OF SECOND ONE'S INTEGRATOR

FIG.2L COMBINED OUTPUT OF ONE'S INTEGRATORS

FIG.2M OUTPUT OF FIRST ZERO'S INTEGRATOR

FIG.2N OUTPUT OF SECOND ZERO'S INTEGRATOR

FIG.2O COMBINED OUTPUT OF ZERO'S INTEGRATORS

INVENTOR
JOHANNES C. VERMEULEN
BY
Fraser and Bogucki
ATTORNEYS

INVENTOR
JOHANNES C. VERMEULEN
BY *Fraser and Bogucki*
ATTORNEYS

INVENTOR
JOHANNES C. VERMEULEN
BY Fraser and Bogucki
ATTORNEYS

Dec. 15, 1970 J. C. VERMEULEN 3,548,327

SYSTEM FOR DETECTION OF DIGITAL DATA BY INTEGRATION

Filed Jan. 14, 1969 5 Sheets-Sheet 5

INVENTOR
JOHANNES C. VERMEULEN
BY
Fraser and Bogucki
ATTORNEYS

United States Patent Office 3,548,327

Patented Dec. 15, 1970

3,548,327

SYSTEM FOR DETECTION OF DIGITAL DATA BY INTEGRATION

Johannes C. Vermeulen, Boulder, Colo., assignor to International Business Machines Corporation, Armonk, N.Y., a corporation of New York Filed Jan. 14, 1969, Ser. No. 790,911
Int. Cl. H03d *3/18*
U.S. Cl. 329—50 14 Claims

ABSTRACT OF THE DISCLOSURE

A detection system is provided in which binary data represented by the presence of transitions at the centers or edges of the various bit cell intervals of a data signal is detected using integration. Two integrations are performed on the data signal over each bit cell interval, one integration being with respect to a reference signal to indicate the presence of "ones" in the various bit cells and the other integration being a plain integration of the data signal itself to indicate "zeros" in the various bit cells. The results of the two integrations at the end of each interval are compared in a voltage comparator to identify the presence of a "one" or a "zero." Accuracy of the detection system may be improved in situations where the "one" or data transitions experience greater peak shift than the "zero" or clock transitions by increasing the results of the "ones" integration relative to the plain or "zeros" integration.

BACKGROUND OF THE INVENTION

Field of the invention

The present invention relates to data detection systems, and more particularly to systems in which detection of encoded data is accomplished by integration of the data signal.

Description of the prior art

A variety of techniques are available for detecting data which is in digitally encoded form. The particular technique used depends on a number of factors including the type of encoding employed. Certain types of encoding such as phase modulation denote data by the sense of signal transitions within the various bit cell intervals. Data encoded in this fashion may be detected by integrating the data signal over each bit cell interval with respect to a reference signal, one such arrangement being shown in U.S. Pat. 3,217,183 of Thompson et al. In the Thompson et al. arrangement, the reference signal has a constant frequency and is either in-phase with or out-of-phase with the phase modulated data signal during each of the bit cell intervals thereof. Accordingly, integration over a bit cell interval in which the reference signal is in-phase with the data signal provides a direct indication that a "one" is present, while integration over a bit cell interval in which the reference signal is in-phase with the complement of the data signal provides a direct indication that a "zero" is present.

Many types of encoding such as NRZI and double frequency (frequency modulation) represent data by the presence or absence of transitions at the centers of the bit cell intervals. Data encoded in this fashion is readily detected by arrangements in which peak pulses corresponding to the various transitions of the data signal are selectively gated, the "one" or data pulses at the centers of the bit cell intervals being gated to the output to the exclusion of "zero" or clock pulses at the edges of the bit cell intervals. Arrangements of this type detect data in reasonably accurate fashion so long as noise or other spurious signals are not present. Problems arise, however, when such signals are present at or adjacent the center of one or more of the bit cell intervals. In such situations, the noise pulses within those bit cell intervals representing a "zero" are frequently gated to the output as "one" pulses.

Detection by integration rather than pulse gating is advantageous, at least from the standpoint of susceptibility to noise and other spurious signals. Integration over each bit cell interval provides a representation of the nature of the data signal over the entire interval rather than at one particular time location. A noise spike occurring within an interval and which might erroneously be detected as a "one" in a pulse gating system has relatively little effect on the total result of the integration, and errors resulting therefrom are virtually eliminated.

Despite the attendant advantages in data detection by integration, problems arise when the integration technique commonly and successfully used with phase encoded data is employed in an attempt to detect data encoded in other formats. Where double frequency encoding is used, for example, an integration of the data signal with respect to a reference signal provides results which may be used to determine the data content of the various bit cell intervals. In such an arrangement, however, the desirable voltage comparison technique used in the detection of phase encoded data cannot be employed. Instead, the results of successive integrations must be compared, a process which is cumbersome and not always reliable. A further problem arises when an attempt is made to detect data which is encoded in a manner such that the resulting signal has more than two different time intervals between transitions thereof. In modified frequency encoding which is disclosed in a copending application, Ser. No. 653,784, filed July 17, 1967, now Pat. No. 3,500,385 and assigned to the assignee of the present application, a transition is written at the center of each bit cell representing a "one." Transitions are written at the leading edges of bit cells representing a "zero" unless preceded by a bit cell in which a "one" is written. If a modified frequency encoded data signal is integrated with respect to a reference signal, the results of successive integrations may be compared to denote the data carried by the signal so long as two or more successive "zeros" do not occur. Where successive "zeros" are present, the data signal has three different intervals between transitions and this technique cannot be used. Similar problems arise in the detection by integration of modified zero encoded data, which encoding technique is described in a copending application, Ser. No. 733,475, filed May 31, 1968, and assigned to the assignee of the present application. Modified zero encoding is similar to modified frequency encoding except that alternate "zero" or clock transitions are not written in a succession of zeros, and the data signal may therefore have as many as four different intervals between transitions.

Where double frequency encoded data is to be detected, the necessity for comparing successive integration results can be avoided if the reference signal is shifted so as to assume a different phase relationship relative to the data signal. Integration over each bit cell interval provides a value which may be compared with a reference or threshold value to denote the data carried by the bit cell. Such threshold detection can also be used with data encoded in modified frequency or modified zero fashion, with no limitation on the number of zeros which may occur in succession. This technique, however, is even more unreliable than that in which the results of successive integrations are compared. The differences between integration values provided by "one" bit cell intervals and "zero" bit cell intervals may become very small, particularly where considerable peak shift is present. The threshold level may accordingly be exceeded by the results of integration over "zero" bit cell intervals, and the results of integrations over "one" bit cell intervals may be less than the threshold level, leading to error. This is true even though the threshold level is maintained relatively constant by complex and expensive circuitry. In the more common case where the threshold level varies or drifts, erroneous readings may be provided even though the results of the integrations assume desired values.

SUMMARY OF THE INVENTION

Detection systems in accordance with the invention detect data in digitally encoded form by performing two separate integrations on the data signal over each bit cell interval. A first or "ones" integration is performed with respect to a reference signal to indicate the presence of "ones" in the various bit cells. A plain or "zeros" integration of the data signal with respect to the absolute value thereof is also performed over each bit cell interval to indicate "zeros." The results of the two different integrations for each bit cell are compared in a voltage comparator to identify the presence of a "one" or a "zero" within the cell. Data encoded in modified frequency, modified zero or similar fashions is reliably and accurately detected without the need for threshold sensing, comparison of the results of successive integrations or other undesirable and unreliable techniques.

In one preferred arrangement of a detection system according to the invention, a sawtooth waveform generated in synchronism with the incoming data signal is used to provide first and second complementary reference signals. A pair of "ones" integrators responds to the reference signals and to the true and complementary values of the incoming data signal to integrate the data signal over each bit interval, the integrators being squelched at the end of each bit cell interval by a control signal derived from the sawtooth waveform. The outputs of the integrators at the end of each bit cell interval are ORed together providing one of the two different inputs of a voltage comparator. The other voltage comparator input is derived from a pair of "zeros" integrators which are coupled to receive the incoming data signal and the complement thereof, and which perform a plain integration of the absolute value of the data signal over each bit cell interval. The "zeros" integrators are squelched using the sawtooth waveform derived control signal. The voltage comparator enables one of the inputs of an AND circuit whenever the output of the "ones" integrators exceeds that of the "zeros" integrators indicating that a "one" is present. A pulse derived from the control signal enables the other input of the AND circuit to provide an output pulse via an associated single shot multivibrator.

In accordance with one particular feature of the invention, errors which might otherwise occur as a result of data signals in which the data transitions are peak shifted to a greater extent than the clock transitions are avoided by an arrangement in which the outputs of the "ones" integrators are increased in value relative to the outputs of the "zeros" integrators. The combined output of the "ones" integrators, which might otherwise be of lesser value than the combined output of the "zeros" integrators in the presence of widely shifted data or "one" transitions, is increased by a factor which compensates for the differences in peak shift without allowing the "ones" integrators output to exceed that of the "zeros" integrators in the presence of a "zero."

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIGS. 2A through 2U are waveforms useful in explaining the operation of the FIG. 1 arrangement and the differences between the FIG. 1 arrangement and the prior art;

FIGS. 5A through 5I are waveforms useful in explaining the operation of the FIG. 1 arrangement when the outputs of the "ones" integrators are increased to compensate for unequal peak shift of the data and clock transitions.

DETAILED DESCRIPTION OF THE DRAWINGS

Figure 1:
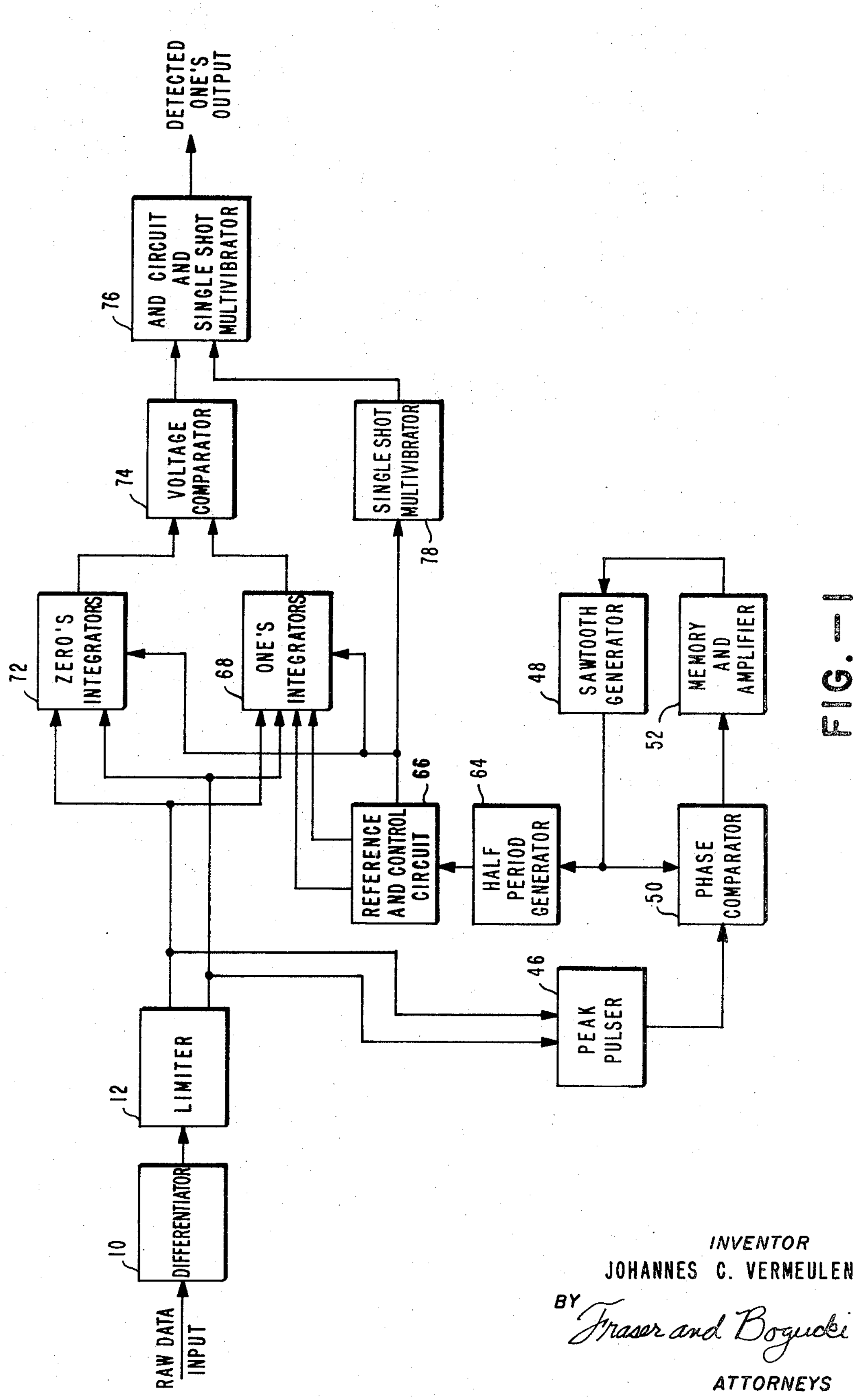
FIG. 1 is a block diagram of a digital data detection system in accordance with the invention.

In the FIG. 1 arrangement, the raw data signal derived from a recording medium such as a magnetic tape, drum, disk, strip or the like, or from a communications channel or other appropriate source, is differentiated in a differentiator 10 and limited by a limiter 12. The limiter 12 is not essential to the successful operation of the circuit, but when present provides a more clearly defined form of the data signal derived from the differentiator 10. The limiter 12 is shown in FIG. 1 as having two different outputs which comprise the limited data signal and the complement thereof. In situations where the limiter 12 is eliminated, other appropriate circuitry can be used to derive the complement of the data signal.

Examples of a modified frequency encoded data signal and the complement thereof as might appear at the output of the limiter 12 are provided by FIGS. 2A and 2B. As previously mentioned, modified frequency encoding involves a data transition at the center of each bit cell representing a "one" and a clock transition at the leading edges of bit cells representing a "zero," except where the "zero" bit cell is immediately preceded by a cell in which a "one" is written. Accordingly, data transitions 14, 16, 18, 20 and 22 occur at the centers of the respective bit cell intervals 28, 30, 34, 42 and 44 which represent "ones." The "zero" bit cell intervals 32 and 36 do not have clock transitions at the leading edges thereof since the immediately preceding bit cells 30 and 34 contain "ones." The remaining "zero" bit cell intervals 38 and 40 have clock transitions 24 and 26 respectively at the leading edges thereof.

A peak pulser 46 responds to each transition of the data signal from the limiter 12 to provide a peak pulse, the resulting sequence of pulses being illustrated in FIG. 2C. A sawtooth generator 48 provides a sawtooth waveform which is illustrated in FIG. 2D and which is applied to a phase comparator 50 along with the pulses from the peak pulser 46. The phase comparator 50 and a memory and amplifier 52 maintain the sawtooth waveform in phase-locked relation with the incoming data signal by insuring that the zero-crossings of the sawtooth waveform coincide with the pulses from the peak pulser 46. If a pulse precedes the corresponding zero-crossing of the sawtooth waveform, a correction signal having a value corresponding to the time difference between the peak pulse and zero-crossing and a polarity which will increase the frequency of the sawtooth generator is provided to the memory and amplifier 52. Pulses which follow the corresponding zero-crossings of the sawtooth waveform result in the generation of correction signals of appropriate value and which have a polarity so as to decrease the frequency of the sawtooth generator 48. The correction signals are stored in a memory in the memory and amplifier 52 and are averaged so as to tend to drive the sawtooth generator 48 at a desired frequency and without constant variation due to peak shifts of the pulses from the peak pulser 46. Examples of detailed circuitry which may be used to perform initial and subsequent phase-locking of the sawtooth waveform are provided by U.S. Pats. 3,339,157; 3,192,477; and 3,349,389. It will be understood, of course, that other forms of clock synchronization may be used with this invention. The apparatus just described should be considered as exemplary and not as limiting the invention.

The portion of the FIG. 1 arrangement described thus far is conventional and is similar to the componentry employed by many prior art arrangements which detect data by pulse gating. In such arrangements, the flyback or negative-going excursions of the sawtooth waveform are typically sensed by a binary trigger to provide a sequence of pulses as shown in FIG. 2E. Each gating pulse which commences one-quarter of the distance through the associated bit cell interval and which terminates at a point three-quarters of the time distance through the interval enables an associated gate to pass those pulses which occur in the presence of a gating pulse to the circuit output. Thus, the data pulse 54 within the bit cell interval 28, as shown in FIG. 2C, would be gated to the output as a "one" pulse by the first gating pulse 56, shown in FIG. 2E. Clock or "zero" pulses such as the pulse 58, shown in FIG. 2C, at the leading edge of the bit cell interval 38 do not fall within the "window" provided by one of the gating pulses 56, and are thereby blocked from the output.

A noise pulse or spike 60 typical of that which may occur is illustrated in dotted outline in FIGS. 2A and 2B. The peak pulser 46 responds to the noise pulse 60 by generating one or more corresponding peak pulses, depending upon its duration. Only one peak pulse 62 is shown in FIG. 2C. In a pulse gating type of detection arrangement, the detection process is generally uneffected by such noise pulses except for possible minor variations in the frequency of the sawtooth waveform so long as the resulting peak pulse lies outside of the gating pulses 56. Where the peak pulse falls within the time interval of one of the gating pulses 56, however, as in the case of the pulse 62, such pulse is gated to the output as a "one." This results in an erroneous reading if the bit time interval in which the noise pulse occurs represents a "zero." Such problems may be avoided, however, if detection is performed by integration, the integration over each bit interval taking into consideration the behavior of the data signal over the entire interval rather than within a relatively small time portion thereof.

The sawtooth waveform from the generator 48 shown in FIG. 1 is applied to a half period generator 64 to generate a pulse in response to each zero-crossing of the sawtooth waveform as shown in FIG. 2F. The half period generator pulses are applied to a reference and control circuit 66 to initiate the generation of a control signal shown in FIG. 2G and first and second complementary reference signals shown respectively in FIGS. 2H and 2I. Referring to the first bit cell interval 28, it will be noted that the first reference signal of FIG. 2H is in-phase with the data signal complement and out-of-phase with respect to the data signal itself. Similarly, the second reference signal is in-phase with the data signal and out-of-phase with the data signal complement over the interval 28. The first and second reference signals and the data signal and complement thereof are applied to a pair of ones integrators 68 which integrate the data signal and the complement thereof with respect to the first reference signal over each bit cell interval. The integrators 68 effectively integrate the phase relationships between the first reference signal and the data signal and complement thereof by multiplying the first reference signal by the data signal and by the complement thereof and integrating the separate results thereof. At the end of each bit cell interval, the integrators 68 are squelched under the control of the control signal of FIG. 2G.

A first one of the ones integrators 68 integrates the data signal of FIG. 2A with respect to the first reference signal of FIG. 2H, the results of such integration being shown in FIG. 2J. A second one of the ones integrators 68 simultaneously integrates the data signal complement of FIG. 2B with respect to the first reference signal to provide the results shown in FIG. 2K. The second or complementary reference signal of FIG. 2I is required by the ones integrators 68 as described in connection with FIG. 3 hereafter. The outputs of the ones integrators 68 are ORed together to provide the combined result shown in FIG. 2L.

Each of the ones integrators 68 includes a capacitor coupled to be charged during that portion of each bit cell interval in which the data signal or complement thereof to which the integrator is responsive is in-phase with the first reference signal. During the first bit time interval 28, for example, the first reference signal is out-of-phase with the data signal, and the voltage drop across one of the capacitors remains at zero value. The other integrator capacitor responds to the in-phase relationship between the first reference signal and the data signal complement by charging over the duration of the interval 28 to a maximum value at the end of the interval as shown in FIG. 2K. During the second bit interval 30, the first reference signal is in-phase with the data signal and out-of-phase with the complement thereof providing the results shown in FIGS. 2J and 2K. During the third bit time interval 32, the first reference signal is out-of-phase with the data signal during the first half of the interval, but is in-phase with the data signal during the second half of the interval. The voltage drop across the associated capacitor remains at zero value over the first half of the interval, then increases steadily to a maximum value at the end of the interval as shown in FIG. 2J. At the same time, the capacitor voltage of the other integrator steadily increases during the first half of the bit interval, then remains constant over the second half of the interval.

Minor variations occur in the results of integration when the clock and data transitions of the data signal undergo peak shift. Typical shifts which the various transitions of the signals of FIGS. 2A and 2B may undergo and the peak pulses which result therefrom are shown in dotted outline in FIGS. 2A, 2B and 2C. In this instance, the data transition 14 is assumed to be shifted to the left. The data transitions 16 and 18 are assumed to have been shifted to the right and left respectively because of the substantial differences in the time intervals on the opposite sides thereof. The clock transitions 24 and 26 and the data transitions 20 and 22 are similarly assumed to have been shifted away from one another as shown.

Bit shift normally depends on a number of factors including the particular characteristics of the read head used to sense the data signal where it is recorded on a magnetic medium. The variations in the results of integration due to peak shift are shown in dotted outline in FIGS. 2J, 2K and 2L. In the first bit interval 28, the peak shift of the data transition 14 results in the data signal of FIG. 2A being in-phase with the first reference signal of FIG. 2H during a short portion of the interval to provide the integration results shown in FIG. 2J. Similarly, the data signal complement of FIG. 2B is out-of-phase with the first reference signal during a short portion of the interval providing an integration results of slightly lesser value as shown in FIG. 2K. The noise pulse 60 which occurs within the third bit interval 32 results in the data signal being in-phase with the first reference signal during a short portion of the first half of the bit interval to provide the slight increase shown in FIG. 2J. The output of the second ones integrator is decreased by a corresponding amount as shown in FIG. 2K.

The arrangement of FIG. 1 as discussed thus far is similar to that disclosed in the previously referred to U.S. Pat. 3,217,183 of Thompson et al. In the Thompson et al. arrangement, a pair of integrators are used to integrate a phase encoded data signal and the complement thereof over each bit cell interval with respect to a reference signal. The phase encoded data signal has two different phases, and the reference signal is therefore in-phase with or out-of-phase with the data signal over the entire duration of each bit cell interval. Accordingly, one integrator capacitor charges over the duration of each bit cell interval while the other capacitor remains at zero value. The output of one of the integrators represents "zeros" while the output of the other integrator represents "ones."

Such outputs may be compared in a voltage comparator at the end of each bit interval to determine the data present.

The Thompson et al. arrangement operates in reasonably accurate fashion to detect phase encoded data. Problems arise, however, when data encoded in a different format such as the modified frequency modulation of FIG. 2A is applied to an arrangement of this type for detection. Modified frequency encoding involves three different time intervals between adjacent transitions which may be equal to a bit interval, twice the bit interval or one and one-half times the bit interval. Accordingly, a reference signal which is in-phase with the data signal throughout the duration of one bit interval will be out-of-phase with the data signal through one-half or all of the following bit interal. Where the reference signal is out-of-phase with the data signal over one-half rather than all of the following bit interval, the reference signal may be out-of-phase during the first half of the interval and in-phase during the second half or vice versa. By observing FIGS. 2J and 2K, it is apparent that the outputs of the integrators cannot be compared to determine the data, and accordingly other techniques must be looked to.

One technique which may be employed to determine the data as represented by the two integrations of FIGS. 2J and 2K involves the use of threshold sensing. As shown in FIG. 2L, the combined output of the ones integrators 68 assumes one value at the end of each bit cell interval representing a "one" and a value which is approximately one-half that of the one value at the end of bit cell intervals representing a "zero." By employing a threshold detector having a level 70 as shown in FIG. 2L, "one" bit intervals which have a terminal value of the combined integration results above the level 70 are sensed to the exclusion of "zero" bit intervals which have a terminal value of the combined integration result below the level 70. Threshold detection, however, is undesirable for a number of reasons. Thus, even where complex and expensive circuitry is used, the threshold still has a tendency to drift. The level 70 of FIG. 2L may accordingly drift downward to falsely sense "zeros" or drift upward to a level where it misses the "ones." The problem becomes even more critical when peak shift is present. In such a situation, the combined result of integration over the "one" bit intervals may lie only slightly above the level 70 as shown in the bit intervals 28, 30, 42 and 44 while the results of integration at the end of "zero" bit intervals may lie slightly under the level 70 as shown in the bit interval 40. The slightest drift of the level 70 may accordingly lead to error.

In accordance with the invention, encoded data is detected by performing an integration over each bit cell interval on the data signal itself as well as with respect to a reference signal. The results of the two separate integrations may be compared by a voltage comparator to indicate the data content, rather than using threshold sensing or other undesirable techniques. As shown in FIG. 1, the data signal and its complement are fed to different ones of a pair of zeros integrators 72 where they are integrated over each bit cell interval with respect to the high level or value of the signal. Integration is squelched at the end of each interval by the control signal from the reference and control circuit 66. The results of integration of each of the signals of FIGS. 2A and 2B over each bit cell interval are respectively shown in FIGS. 2M and 2N. The outputs of the two zeroes integrators 72 are ORed together to provide the combined integration result shown in FIG. 2O.

The plain or zeros integration is effectively an integration of the data signal and complement thereof with respect to an unvarying or steady-state reference signal. Thus, the data signal of FIG. 2A within the first bit cell interval 28 is high and therefore in-phase with the steady-state reference signal during the first half of the interval and is low and therefore out-of-phase with the steady-state reference signal during the second half of the interval providing the result shown in FIG. 2M. Similarly, the data signal complement of FIG. 2B is low during the first half of the interval 28 and high during the second half of the interval providing the result shown in FIG. 2N. Peak shift of the data and clock transitions affects the results of the zeros integrations in a manner similar to the ones integrations as shown by the dotted lines in FIGS. 2M, 2N and 2O.

It will be seen that the zeros integrators 72 provide a direct representation of the "zero" bit cell intervals. In modified frequency encoding, the data signal remains constant over the duration of each interval representing a "zero," but changes at the center of each interval representing a "one." By integrating the data signal over each bit interval with respect to an unvarying signal, a combined (that is, ORed) integration result is provided which terminates in a high value at the end of those bit intervals in which the signal level does not change and in which a "zero" is therefore present.

Figures 2P, 2Q, 2R, 2S, 2T, 2U, 5A, 5B, 5C, 5D, 5E, 5F, 5G, 5H, 5I:
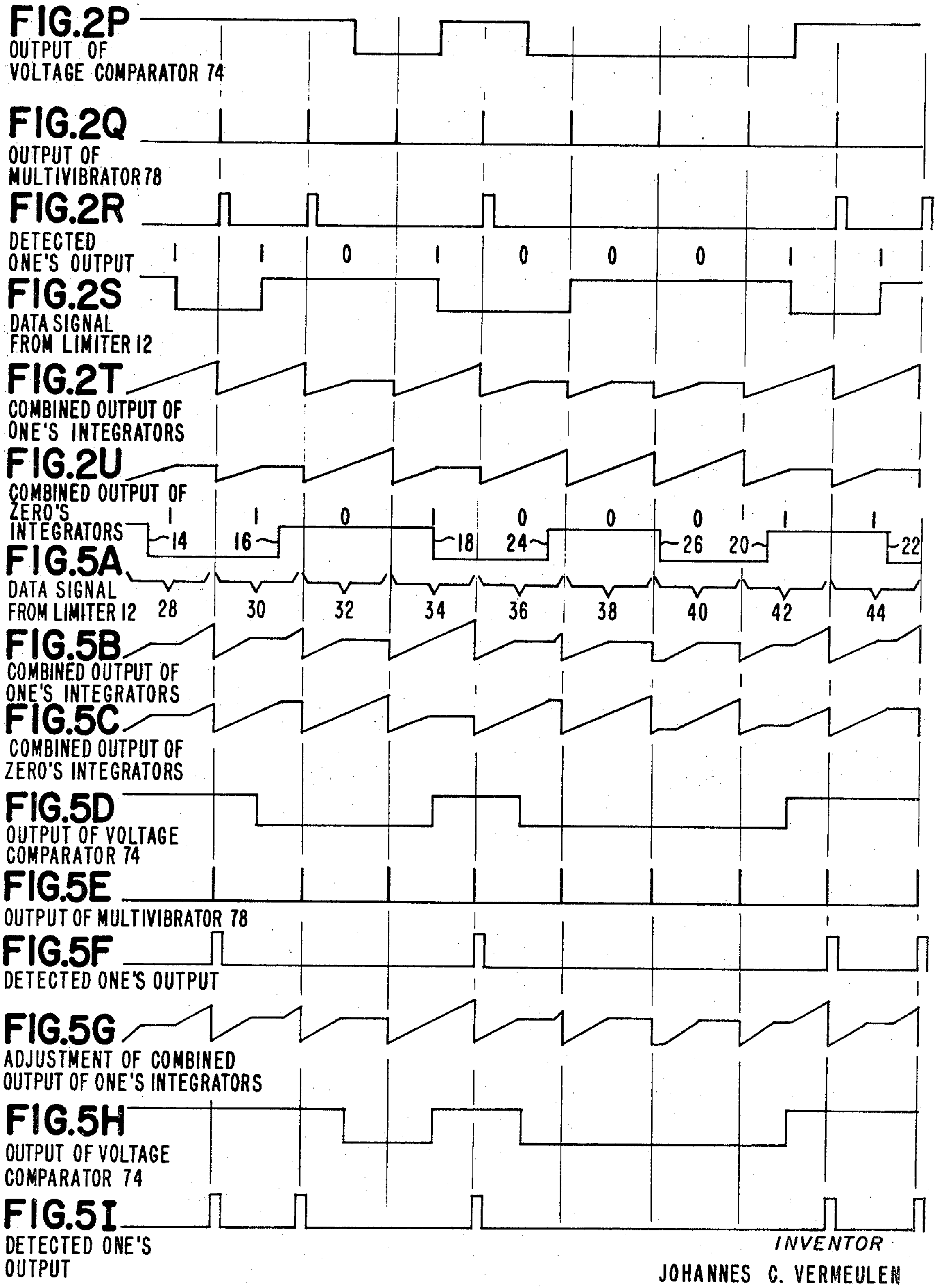

The combined outputs of the ones integrators 68 and the zeros integrators 72 are applied to a voltage comparator 74 to determine which pair of integrators has the largest combined result at the end of each bit interval. If the combined output of the ones integrators 68 exceeds that of the zeros integrators 72, the output of the voltage comparator 74 assumes a high value as shown in FIG. 2P to enable one of the inputs of an AND circuit and single shot multivibrator 76. The other input of the AND circuit and single shot multivibrator 76 is coupled to the reference and control circuit 66 via a single shot multivibrator 78. The multivibrator 78 responds to the control signal from the reference and control circuit 66 to generate a pulse at the end of each bit cell interval as shown in FIG. 2Q. The AND circuit 76 responds to the simultaneous presence of a high output from the voltage comparator 74 and a pulse from the multivibrator 78 to initiate the generation of an output pulse via the associated single shot multivibrator as shown in FIG. 2R. Although the pulses from the multivibrator 78 are shown in FIG. 2Q as occurring exactly at the end of each bit interval, in actual practice these pulses may be shifted slightly to the left by generating the control signal of FIG. 2G early and delaying the squelching of the ones and zeros integrators 68 and 72 in response thereto. This insures that the outputs of the integrators can be compared and applied to enable the input of the AND circuit 78 as appropriate prior to the squelching of the integrators.

It will be seen that where successive "ones" occur in the data signal, the outputs of the two different ones integrators 68 alternate between high and low values. Thus, at the end of the first bit interval 28, the outputs of the first and second ones integrators are respectively low and high. During the second bit interval 30, however, the outputs of the first and second ones integrators are respectively high and low. The ones successively occurring during the bit intervals 42 and 44 result in the output of the first ones integrator being high at the end of the interval 42 and the second ones integrator being high at the end of the interval 44. The first and second zeros integrators 72 behave in similar fashion where successive "zeros" occur. Thus, the output of the second zeros integrator is high at the end of the intervals 36 and 40 while the output of the first zeros integrator is high at the end of the intervening interval 38. Any variation from this routine indicates that something is wrong. This feature may therefore be used for purposes of error checking by making it a condition that where a "one" is provided by the output of one of the ones integrators an immediately following "one" must be provided by the other one of the ones integrators. Similarly, a succession of two or more "zeros" must be provided by alternate responses of the two zeros integrators if the detected data is to be accepted.

A signal representing the data of FIGS. 2A and 2B in modified zero encoded fashion is illustrated in FIG. 2S. Modified zero encoding is the term used herein to describe modified frequency modulation which is disclosed in the previously referred to application, Ser. No. 733,475. It is similar to modified frequency encoding except that transitions at the leading edges of alternate bit intervals within a succession of "zeros" are not written. The signal illustrated in FIG. 2S is accordingly similar to that of FIG. 2A except for the absence of the clock transition at the leading edge of the bit interval 40. Modified zero encoding may involve as many as four different time intervals between transitions and suffers the same detection difficulties as modified frequency encoding. In accordance with the invention, however, the modified zero encoded data may be detected in the same manner as modified frequency encoding by performing the plain or "zeros" integration along with "ones" integrations. FIGS. 2T and 2U illustrate the respective combined outputs of the "ones" integrators 68 and the "zeros" integrators 72 for the data signal of FIG. 2S. The combined outputs may be compared by the voltage comparator 74 since the output of the "ones" integrators 68 is highest at the end of "one" bit cell intervals and the output of the "zeros" integrators 72 is highest at the end of "zero" bit cell intervals. The error checking ability mentioned earlier with respect to modified frequency encoding also exists with modified zero encoding, though in a somewhat different form.

While detection systems in accordance with the invention are highly advantageous in the detection of data carried by signals such as modified frequency and modified zero signals which have more than two different intervals between transitions, it should be understood that such systems may also be advantageously employed with data signals having only two different intervals. Thus, integration of a double frequency encoded signal with respect to a reference signal provides results which may be used to identify the data content using either threshold detection or comparison of the results of successive integrations as previously discussed. By performing a plain integration on the data signal in accordance with the invention, however, integration results are provided which may be compared by a voltage comparator to determine the data.

This invention has application to any encoding system wherein one kind of information is represented by a transition at the center of a bit interval, and another kind of information is represented by the absence of a transition during the bit interval. The power of this invention resides in its ability to provide a positive indication of the absence of a transition, taking the entire interval into account. Thus, this invention can handle not only modified frequency encoding, modified zero encoding, and double frequency encoding, but non-return to zero coding or any other scheme using the same basic rule, as well.

Figure 3:
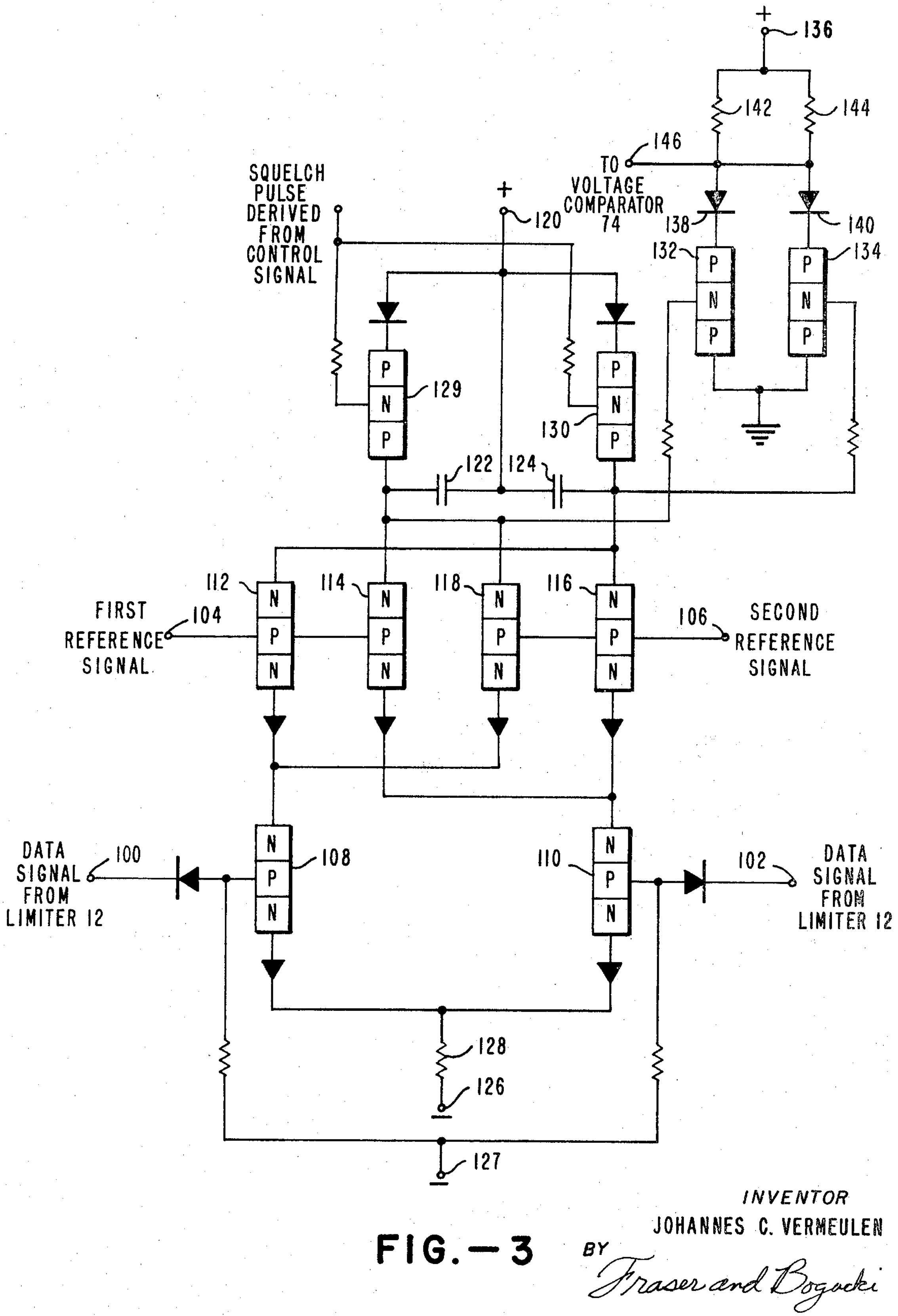
FIG. 3 is a schematic diagram of a circuit which may be used as the "ones" integrators in the FIG. 1 arrangement.

One example of a circuit which may be used as the ones integrators 68 in the FIG. 1 arrangement is schematically illustrated in FIG. 3. The data signal and the complement thereof are respectively applied to inputs 100 and 102, and the first and second complementary reference signals are respectively applied to inputs 104 and 106. An NPN transistor 108 is responsive to the data signal at the input 100 so as to be conductive when the data signal is at its upper value and nonconductive when at its lower value. An NPN transistor 110 is similarly responsive to the complementary data signal at the input 102 so as to be conductive when the complementary data signal is at its upper value and nonconductive when at is lower value. The transistors 108 and 110 are alternately conductive and nonconductive since the data signals at the inputs 100 and 102 are complementary. The transistors 108 and 110 switch at about −1.5 volts in the particular circuit shown.

NPN transistors 112 and 114 are responsive to the first reference signal at the input 104 so as to be conductive when the first reference signal is high and nonconductive when the reference signal is low. Similarly, NPN transistors 116 and 118 are responsive to the second erence signals at the inputs 104 and 106 are complemen- when the second reference signal is high and nonconductive when the second reference signal is low. The two different pairs of transistors 112, 114 and 116, 118 are alternately conductive and nonconductive since the reference signlas at the inputs 104 and 106 are complementary. The transistors 112, 114 and 116, 118 are arranged to switch at approximtaely ground level in the particular circuit shown. Other levels could be selected.

Current from a positive terminal 120 flows to one or the other of a pair of capacitors 122 and 124 depending upon which of the capacitors is coupled to a negative terminal 126. The total current flow between the positive and negative terminals 120 and 126 is constant and is determined by the voltage at the terminal 126, the voltage at a power supply terminal 127, and the value of a resistor 128. The capacitor 122 is coupled to the negative terminal 126 by the simultaneous conduction of the transistors 114 and 110 or by the simultaneous conduction of the transistors 118 and 108. The capacitor 124 is coupled to the terminal 126 by the simultaneous conduction of the transistors 116 and 110 or by the simultaneous conduction of the transistors 112 and 108. The capacitor 124 is charged in a negative direction from the voltage at the positive terminal 120 during that portion of each bit cell interval in which the data signal is in-phase with the first reference signal. The capacitor 122 is similarly charged in a negative direction from the terminal 120 voltage during that portion of each bit cell interval in which the data signal is out-of-phase with the first reference signal. At the end of each interval, a pulse derived from the control signal is applied to momentarily bias a pair of PNP transistors 129 and 130 into conduction to discharge the capacitors 122 and 124 to the voltage of the positive terminal 120.

The conductivities of a pair of PNP transistors 132 and 134 are respectively controlled by the voltage drops across the capacitors 122 and 124. The transistors 132 and 134 are coupled in emitter follower fashion between ground and a common positive terminal 136 via diodes 138 and 140 and resistors 142 and 144. The junctions between each of the resistors 142 and 144 and the associated diodes 138 and 140 are coupled to one another and to an input terminal 146 of the voltage comparator 74 (shown in FIG. 1). The conductivity of each of the transistors 132 and 134 determines the voltage at the lower end of the associated one of the resistors 142 and 144. The diodes 138 and 140 and the base-emitter junctions of the transistors 132 and 134 perform an analog OR function by providing the lowest voltage at the ends of the resistors 142 and 144 to the comparator input terminal 146. This voltage represents the combined output of the integrators and corresponds to the waveform shown in FIG. 2L. The waveform of FIG. 2L is depicted as increasing from an initial value in a positive-going direction, however, for convenience of illustration. In addition to performing an analog OR function, the circuit comprising the transistors 132 and 134, the diodes 138 and 140 and the resistors 142 and 144 prevents overloading of the capacitors 122 and 124 which might otherwise occur if the capacitor voltages were directly applied to the voltage comparator.

The operation of the ones integrators shown in FIG. 3 may be further illustrated in terms of the first few bit intervals shown in FIG. 2. During the first half of the bit cell interval 28 the data signal and its complement are respectively high and low, biasing the transistors 108 and 110 into conduction and nonconduction while the first and second reference signals are respectively low and high, biasing the transistors 116 and 118 into conduction and the transistors 112 and 114 into nonconduction. The conducting transistors 108 and 118 complete a circuit path between the capacitor 122 and the negative terminal 126 to charge the capacitor 122 during the first half of the interval 28 at a fixed rate determined by the constant current from the positive terminal 120. During the second half of the bit cell interval 28, the data signal and its complement bias the transistors 108 and 110 into nonconduction and conduction respectively. At the same time, the first reference signal biases the transistors 112 and 114 into conduction and the second reference signal biases the transistors 116 and 118 into nonconduction. The conducting transistors 110 and 114 complete a circuit path between the capacitor 122 and the negative terminal 126 allowing the capacitor 122 to continue to charge during the second half of the interval 28 at the fixed rate determined by the current from the positive terminal 120. At the end of the interval 28, the capacitor 122 has a large voltage drop thereacross as shown in FIG. 2K while the capacitor 124 has no voltage drop thereacross as shown in FIG. 2J.

During the second bit interval 30, the data signal and its complement are respectively in-phase and out-of-phase with the first reference signal. The capacitor 124 accordingly charges over the entire interval to a relatively large value as shown in FIG. 2J while the capacitor 122 remains uncharged as shown in FIG. 2K.

During the first half of the third bit cell interval 32, the data signal and the complement thereof are respectively out-of-phase with and in-phase with the first reference signal. The data signal and the second reference signal both being high, the transistors 108 and 118 conduct to charge the capacitor 122. The capacitor 124 remains uncharged. During the second half of the bit interval 32 the data signal is in-phase with the first reference signal and both are high. The transistors 108 and 112 therefore conduct to charge the capacitor 124. The charge on the capacitor 122 remains at the level reached at the end of the first half of the interval 32. The charges on the capacitors 122 and 124 are therefore substantially equal at the end of the interval 32, and a voltage equal to that at the lower ends of both resistors 142 and 144 is applied to the voltage comparator 74.

Figure 4:
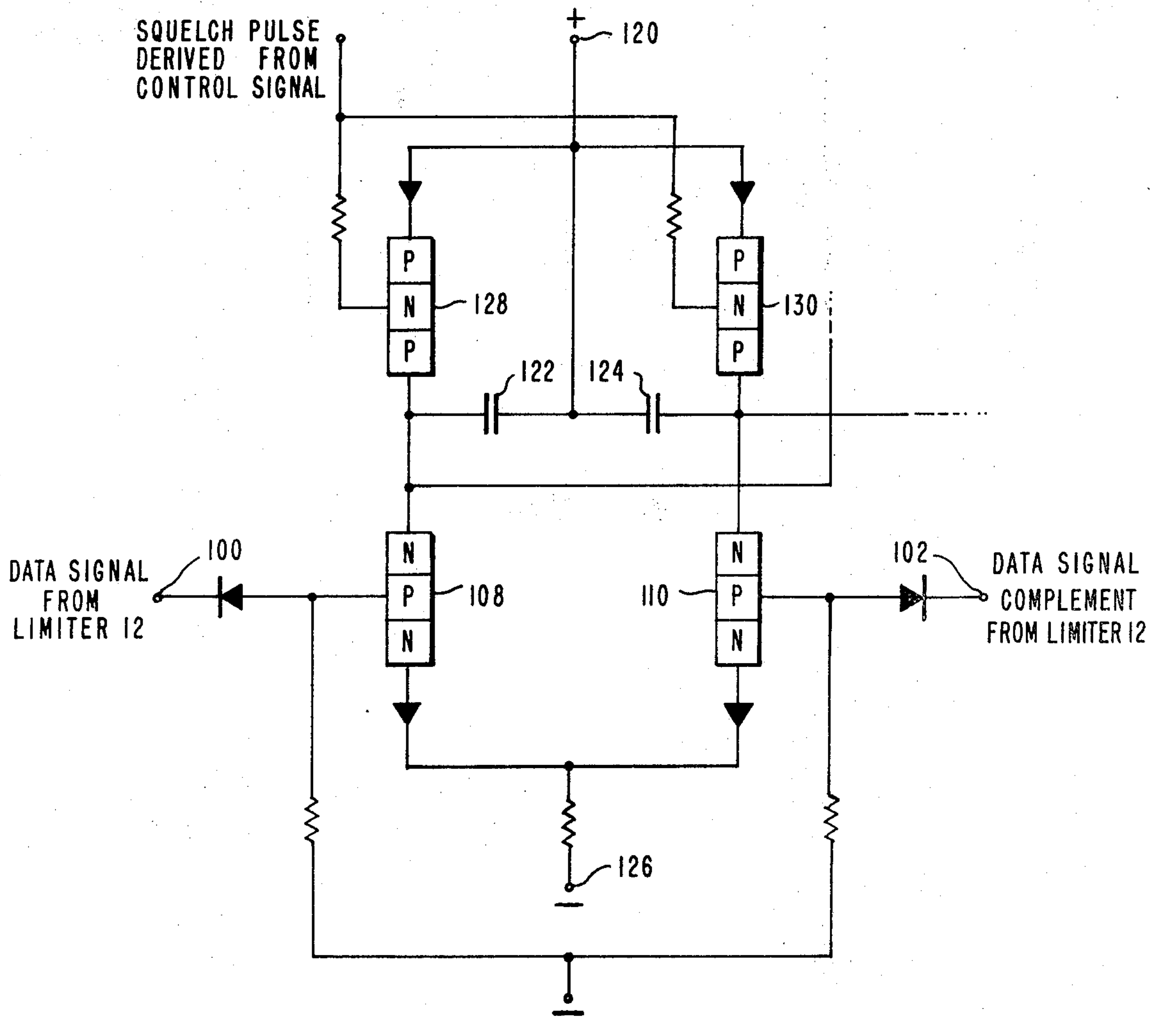
FIG. 4 is a schematic diagram of a circuit which may be used as the "zeros" integrators in the FIG. 1 arrangement.

A circuit which is similar to that shown in FIG. 3 and which may be used as the zeros integrators 72 in accordance with the invention is schematically illustrated in FIG. 4. The output portion of the circuit which couples the capacitors 122 and 124 to the second input of the voltage comparator 74 and which is identical to that shown in FIG. 3 has been eliminated for simplicity. The zeros integrators perform a plain integration of the data signal, and accordingly the inputs 104 and 106 and the transistors 112, 114, 116 and 118 of the FIG. 3 arrangement are eliminated. The transistors 108 and 110 are directly coupled to the capacitors 122 and 124 respectively. When the data signal is high and the complement thereof is low, the transistors 108 and 110 are respectively conductive and nonconductive coupling the capacitor 122 to be charged by the current from the positive terminal 120. Similarly, when the data signal complement is high and the data signal is low, the transistor 110 conducts to charge the capacitor 124. The transistors 128 and 130 respond to the squelching pulse derived from the control signal at the end of each bit cell interval to discharge the capacitors 122 and 124.

As previously pointed out, the data signal remains high or low throughout the duration of each "zero" bit cell interval since no transition is present at the center thereof. This fact is utilized by the zeros integrators to provide a combined result which exceeds that of the ones integrators at the end of each "zero" bit interval. During a "one" bit cell interval, the level of the data signal changes at the center thereof providing a combined output of the zeros integrators which is less than that of the ones integrators at the end of the interval.

During the first half of the bit interval 28, the data signal is high and the transistor 108 in FIG. 4 conducts to charge the capacitor 122. During the second half of the interval 28, the data signal complement is high biasing the transistor 110 into conduction to charge the capacitor 124 while the charge on the capacitor 122 remains constant. The charges on the two different capacitors 122 and 124 at the end of the interval 28 are approximately equal as shown in FIGS. 2M and 2N, and the combination thereof shown in FIG. 2O is applied to the second input of the voltage comparator 74. The combined output of the ones integrators being higher than that of the zeros integrators, the output of the comparator 74 assumes its higher level to provide a "one" pulse to the output as shown in FIGS. 2P, 2Q and 2R.

During the first half of the second bit interval 30, the capacitor 124 charges while the capacitor 122 remains uncharged. During the second half of the interval 30, the charge on the capacitor 124 remains constant and the capacitor 122 charges to a level substantially equal to that of the capacitor 124. The combined output of the zeros integrators as shown in FIG. 2O is again less than that of the ones integrators, and a "one" pulse is generated at the output.

During the first half of the third bit interval 32, the capacitor 122 charges while the capacitor 124 remains uncharged. The data signal and the complement thereof continue to remain high and low respectively during the second half of the interval 32, and the capacitor 122 continues to charge, with the capacitor 124 remaining uncharged. The combined output of the zeros integrators at the end of the interval 32 exceeds that of the ones integrators to prevent the generation of a "one" pulse at the output.

The voltage comparator 74 may assume any appropriate form and may comprise, for example, an arrangement similar to that shown in FIG. 3 of the previously referred to U.S. Pat. 3,217,183 of Thompson et al. As previously discussed, voltage comparison is preferred over threshold detection because it determines data content in accordance with the relative values of the integrator outputs rather than with respect to a reference or threshold level.

The detection system shown in FIG. 1 and described with reference to FIG. 2 functions to detect encoded data in highly accurate fashion so long as bit shift of the data signal is not excessive. Where one or more of the data signal transitions are shifted by more than 25% of the bit interval, error may result.

FIG. 5A shows a data signal similar to that of FIG. 2A but which has experienced a much greater bit shift. The combined results of the ones and zeros integrations over each of the bit cell intervals are illustrated in FIGS. 5B and 5C. While the shift of various ones of the data signal transitions is extensive, the output of the ones integrators 68 still exceeds that of the zeros integrators 72 at the ends of the intervals 28, 34, 42 and 44 to provide "one" pulses to the output as shown in FIGS. 5D, 5E and 5F. Similarly, the output of the zeros integrators 72 exceeds that of the ones integrators 68 at the ends of the intervals 32, 36, 38 and 40 to prevent the generation of "ones" pulses at the output. A problem arises, however, in the case of the bit interval 30 in which the data transition 16 has been shifted to the right by an amount greater than 25% of the interval. The combined output of the zeros integrators exceeds that of the ones integrators at the end of the interval 30, and accordingly a "one" pulse is not provided at the output as shown.

It will be observed that, for certain types of encoding such as of the modified frequency and modified zero types, the data transitions are shifted to a greater extent than the clock transitions. In other types of encoding such as of the double frequency type, the clock transitions typically experience a greater peak shift than the data transitions since the greatest differences in the sizes of adjacent time intervals occur at the clock transitions.

In accordance with the invention, unequal peak shift of the data and clock transitions is compensated for by increasing the outputs of the ones integrators or the zeros integrators as appropriate. In the case of the modified frequency encoded data signal shown in FIG. 5A, the outputs of the ones integrators shown in FIG. 3 are increased relative to the outputs of the zeros integrators shown in FIG. 4. This may be accomplished by multiplying the output of each ones integrator or the combination thereof by an appropriate factor such as 1.2. A more desirable technique however is to increase the rate of charging of the capacitors 122 and 124 in the FIG. 3 arrangement. This may be accomplished by decreasing the size of the resistor 128 so as to increase the current from the positive terminal 120, or by using the same current but decreasing the capacitances of the capacitors 122 and 124. The amount by which the rate of charging of the ones integrator capacitors may be increased is, of course, limited by the resulting outputs thereof during those bit intervals in which a "zero" is present. The amount of increase is accordingly a compromise between a factor which will insure that the ones integrators output exceeds that of the zeros integrators in the presence of a severely shifted data or "one" transition and a factor which will insure that the ones integrators output does not exceed that of the zeros integrators whenever a "zero" is present. An increase of the rate of charging by a factor on the order of 1.2 or 1.3 has been found to be satisfactory for most applications.

The combined output of the ones integrators as illustrated in FIG. 5G corresponds to that of FIG. 5B but has been increased by a factor on the order of 1.3. It will be noted that the waveform of FIG. 5G exceeds that of FIG. 5C at the end of each of the "one" intervals including the previously troublesome interval 30 to provide "one" pulses to the output as shown in FIGS. 5H and 5I. The output of the ones integrators at the end of each of the "zero" bit cell intervals is still less than that shown in FIG. 5C, however, and the presence of "zeros" in these intervals is properly recognized.

A similar type of compensation may be provided in instances where the data is encoded in a format such as of the double frequency type in which the clock or "zero" transitions experience greater peak shift than the data or "one" transitions. This may be accomplished by increasing the rate of charging of the capacitors 122 and 124 within the zeros integrators shown in FIG. 4. The resulting output of the zeros integrators exceeds that of the ones integrators at the ends of "zero" bit intervals in which the clock transitions experience a relatively great amount of shift, yet is less than the output of the ones integrators at the ends of "one" bit intervals.

The use of two separate integrators for the ones integrators and for the zeros integrators has been shown and described for purposes of example only, and a single integrator capable of integrating both positively and negatively can be substituted for each such pair if desired. In such a case, the single ones integrator may be coupled to integrate in a positive direction whenever the data signal is in-phase with the reference signal and in a negative direction whenever the data signal is out-of-phase with the reference signal. Similarly, the single zeros integrator may be coupled to integrate in a positive direction whenever the data signal assumes its higher level and in a negative direction whenever the data signal assumes its lower level. The reference signal and its complement, moreover, need not have transitions at the bit cell boundaries as shown in FIGS. 2H and 2I as long as they have transitions at the centers of the bit cells.

In cases where the data signal has no transitions at the edges of the bit cells (for example, NRZI), the restriction of the integrating interval between quenchings to one bit cell does not exist, and integration intervals which extend for longer periods of time may be used. For example, in detecting an NRZI waveform, the integrating interval could be selected to run from the center of one bit cell to the center of the second following bit cell, if desired.

While the invention has been particularly shown and described with reference to a preferred embodiment thereof, it will be understood by those skilled in the art that various changes in form and detail may be made therein without departing from the spirit and scope of the invention.

What is claimed is:

1. A system for detecting data represented by an alternating data signal, comprising:

means responsive to the alternating data signal for generating an alternating reference signal in synchronism therewith;

first integrating means responsive to the alternating data signal and the alternating reference signal for integrating the data signal with respect to the reference signal over each of a succession of time intervals of the data signal;

second integrating means responsive to the alternating data signal for integrating the data signal over each of the time intervals thereof; and means responsive to the first and second integrating means for comparing the results of the integrations performed over each of the time intervals by the first and second integrating means to provide an output indication of the data represented by the alternating data signal.

2. A system in accordance with claim 1, further including means for increasing the results of integration by the first integrating means over each time interval to compensate for data signals having clock transitions which are subject to peak shift and data transitions which are generally subject to greater peak shift than the clock transitions.

3. A system in accordance with claim 1, wherein the time intervals of the data signal define bit cell intervals, and the data signal denotes data by the presence or absence of a transition thereof at the center of each bit cell interval.

4. A system in accordance with claim 3, wherein the reference signal comprises a transition at the center of each of the bit cell intervals.

5. A system in accordance with claim 4, wherein the reference signal is either wholly in-phase with the data signal or wholly out-of-phase with the data signal over those bit cell intervals having a transition of the data signal at the center thereof and out-of-phase with the data signal over only a portion of those bit cell intervals which do not have a transition of the data signal at the center thereof.

6. A system in accordance with claim 5, wherein the data signal comprises modified frequency encoding of the data.

7. A system in accordance with claim 5, wherein the data signal comprises modified zero encoding of the data.

8. A system for detecting data represented by the presence or absence of a transition of an alternating data signal at the center of each of a succession of bit intervals thereof, comprising:

means responsive to the alternating data signal for generating an alternating reference signal in synchronism therewith;

a first pair of integrating means responsive to the data signal and to the reference signal, one of the first pair of integrating means integrating the data signal with respect to the reference signal over each of the bit intervals, and the other one of the first pair of integrating means integrating the complement of the data signal with respect to the reference signal over each of the bit intervals;

means responsive to the first pair of integrating means for combining the results of the integrations performed thereby over each bit interval;

a second pair of integrating means responsive to the data signal, one of the second pair of integrating means integrating the data signal over each of the bit intervals, and the other one of the second pair of integrating means integrating the complement of the data signal over each of the bit intervals;

means responsive to the second pair of integrating means for combining the results of the integrations performed thereby over each bit interval; and means responsive to the combined results of the first and second pairs of integrating means for comparing the combined results of the two different pairs of integrating means at the end of each bit interval to provide an output indication whenever the combined result of the first pair of integrating means exceeds the combined result of the second pair of integrating means.

9. A system in accordance with claim 8, further including means responsive to the alternating reference signal for generating a gating pulse at the end of each bit interval, and means responsive to the simultaneous presence of a gating pulse and said output indication of the means for comparing for providing an output pulse.

10. A system in accordance with claim 8, wherein the first pair of integrating means comprises first and second integrators, and the second pair of integrating means comprises third and fourth integrators, and further comprising means responsive to the alternating reference signal for quenching the first, second, third and fourth integrators at the end of each bit interval.

11. A system in accordance with claim 10, wherein the first and second integrators comprise a pair of capacitors, means for charging a first one of the pair of capacitors whenever the data signal and the reference signal are in-phase, and means for charging a second one of the pair of capacitors whenever the complement of the data signal and the reference signal are in-phase, said quenching means removing the charge on the pair of capacitors at the end of each bit interval, and wherein the means for combining the results of the first pair of integrating means comprises means for providing a first voltage representative of the charge on the first one of the pair of capacitors, means for providing a second voltage representative of the charge on the second one of the pair of capacitors, and means for applying the greater one of the first and second voltages to a first input of the means for comparing.

12. A system in accordance with claim 11, further comprising means for increasing the rate of charging of the pair of capacitors whenever a data signal having greater bit shift of data transitions thereof than of clock transitions thereof is to be detected.

13. A system in accordance with claim 11, wherein the third and fourth integrators comprise a pair of capacitors, means for charging a first one of the pair of capacitors whenever the data signal assumes a selected level, and means for charging a second one of the pair of capacitors whenever the complement of the data signal assumes a selected level, said quenching means removing the charge on the pair of capacitors at the end of each bit interval, and wherein the means for combining the results of the second pair of integrating means comprises means for providing a first voltage representative of the charge on the first one of the pair of capacitors, means for providing a second voltage representative of the charge on the second one of the pair of capacitors, and means for applying the greater one of the first and second voltages to a second input of the means for comparing.

14. A system in accordance with claim 12, wherein the means for comparing comprises a voltage comparator.

References Cited

UNITED STATES PATENTS 3,217,183 11/1965 Thompson et al. ----- 307—232

ROY LAKE, Primary Examiner

L. J. DAHL, Assistant Examiner

U.S. Cl. X.R.

329—104; 307—232